United States Patent
Foyteck

(10) Patent No.: US 10,662,077 B2
(45) Date of Patent: May 26, 2020

(54) WASTE TREATMENT SYSTEM AND METHOD

(71) Applicant: Bottleless Water Solutions, LLC, Indianapolis, IN (US)

(72) Inventor: Michael D. Foyteck, Clarkston, MI (US)

(73) Assignee: BOTTLELESS WATER SOLUTIONS, LLC, Carmel, IN (US)

( * ) Notice: Subject to any disclaimer, the term of this patent is extended or adjusted under 35 U.S.C. 154(b) by 312 days.

(21) Appl. No.: 15/417,585

(22) Filed: Jan. 27, 2017

(65) Prior Publication Data
US 2017/0239597 A1    Aug. 24, 2017

Related U.S. Application Data

(60) Provisional application No. 62/299,429, filed on Feb. 24, 2016.

(51) Int. Cl.
C02F 1/00        (2006.01)
C02F 101/20      (2006.01)

(52) U.S. Cl.
CPC .............. *C02F 1/008* (2013.01); *C02F 1/001* (2013.01); *C02F 2101/20* (2013.01); *C02F 2201/782* (2013.01); *C02F 2303/04* (2013.01); *C02F 2303/16* (2013.01); *C02F 2303/18* (2013.01)

(58) Field of Classification Search
CPC ...... C02F 1/008; C02F 1/001; C02F 2303/18; C02F 2303/04; C02F 2303/16; C02F 2101/20; C02F 2201/782
See application file for complete search history.

(56) References Cited

U.S. PATENT DOCUMENTS

| 3,932,278 | A | * | 1/1976 | Meidl | C02F 1/001 210/794 |
| 5,190,659 | A | * | 3/1993 | Wang | B01D 15/00 210/135 |
| 6,132,629 | A | | 10/2000 | Boley | |
| 9,199,231 | B2 | | 12/2015 | Strain | |
| 2010/0200522 | A1 | | 8/2010 | Tischendorf et al. | |
| 2012/0043282 | A1 | * | 2/2012 | Przecop | C02F 1/001 210/744 |

(Continued)

FOREIGN PATENT DOCUMENTS

WO    0154786 A1    8/2001

*Primary Examiner* — Liam Royce
(74) *Attorney, Agent, or Firm* — Dickinson Wright PLLC

(57) ABSTRACT

A water treatment system includes a water tank, a water filtration media, and an ozone gas source. A control system operates a service mode of the water treatment system during which an external water source is filtered by the filtration media. The control system also operates a regeneration mode of the water treatment system for regenerating the filtration media. The regeneration mode includes a first backwash mode to backwash the filtration media with the external water source. The regeneration mode includes a draw mode subsequent to the first backwash mode to draw ozone into the water tank and into contact with the filtration media. The regeneration mode includes a second backwash mode subsequent to the draw mode to expel ozone from the water tank and the filtration media prior to switching the system back into the service mode for filtration of the water source with the regenerated filtration media.

13 Claims, 3 Drawing Sheets

(56) References Cited

U.S. PATENT DOCUMENTS

| | | | |
|---|---|---|---|
| 2013/0075313 A1* | 3/2013 | Handy | C02F 1/42 210/141 |
| 2014/0175016 A1 | 6/2014 | Strain | |
| 2015/0343336 A1* | 12/2015 | Mackay Pett | B01D 24/4636 502/22 |
| 2015/0360155 A1* | 12/2015 | Peterson, II | B01D 37/025 210/195.1 |
| 2015/0374895 A1* | 12/2015 | Friederichs | A61M 1/1672 210/87 |

* cited by examiner

WASTE TREATMENT SYSTEM AND METHOD

CROSS-REFERENCE TO PRIOR APPLICATION

This non-provisional patent application claims the benefit of U.S. Provisional Patent Application Ser. No. 62/299,429 filed Feb. 24, 2016, the entire disclosure of the application being considered part of the disclosure of this application and hereby incorporated by reference.

BACKGROUND OF THE INVENTION

1. Field of the Invention

The subject invention is related to a water treatment system as well as a method of regenerating a water filtration media of a water treatment system.

2. Description of the Prior Art

Water filtration systems for removing iron, manganese, arsenic, lead and other contaminants and sediments from water have long been in use. Dissolved iron which is not filtered from water can lead to discoloration from oxidation and can thereby stain bathtub, sinks as well as clothing during a wash cycle. Additionally, filtered water is safer to drink, cook with, and otherwise use. Thus, water is regularly filtered free of these contaminants, more particularly because levels of arsenic and lead in water are regulated by the EPA to levels of <10 PPB and <15 PPB, respectively. Indeed, the levels of lead in water have received significantly more attention following the recent water crisis in Flint, Mich. Accordingly, to reduce the infiltration of particulates and contaminants into a home, office, or industrial building, filtration systems are often positioned near to where water enters the home, office, or industrial building from an external water source, such as a well or municipal water distribution system. As such, the water can preferably be filtered of the contaminants/particulates prior to any water softening and further distribution and use of the filtered water within the home, office, or industrial building.

Water filtration systems typically include a water tank which houses a water filtration/adsorption media and a control system for switching the water filtration system between a service mode (during which water is filtered and delivered to the home, residence, or industrial building) and a regeneration mode (during which the filtration/adsorption media is cleaned/regenerated to remove contaminants and particulates). In some instances, other water treatment systems are available for use alone or in addition to the water filtration system which further disinfects water by removing organisms such as bacteria from the water before it is used. For example, it is known to bring ozone gas into contact with the water because ozone gas can be very effective at killing waterborne organisms, and thus disinfecting the contaminated water.

Ozone gas treatment systems may employ electric air pumps for injecting ozone gas into the water for disinfection. Such ozone gas treatment systems are expensive and complex, and often require regular specialized servicing in order to function effectively. Alternative systems employ water restricting devices to create suction in a line for suctioning ozone gas, using water pressure from a water supply pump. However, problems with effective suction of ozone gas arise when the water supply pump cannot produce a suitable amount of water pressure to produce a suitable amount of suction.

Additionally, other ozone treatment systems utilize a head or layer of ozone in the top of the water tank in order to implement oxidation and disinfection of the water during the filtration or service mode. In other words, these ozone treatment systems require that the water passes through a layer of ozone during the water treatment cycle for purposes of effectively treating the water with ozone prior to its introduction to the water filtration media. However, the interaction of water with the ozone during the water treatment cycles can create carcinogenic byproducts and thus present a health danger. Furthermore, such water treatment systems are not commercially practical because they require significant regulatory approval prior to their sale and use by the public due to their reliance on ozone to modify and chemically change the water during treatment.

Thus, there remains a significant and continuing need for a simpler design of a water treatment system that relies on ozone and is commercially feasible. Thus, there also remains a significant and continuing need for a method of regenerating a water filtration media with ozone in a commercially viable manner.

SUMMARY OF THE INVENTION

The subject invention is directed to a water treatment system which includes a control system configured to operate a service mode and a regeneration mode of the water treatment system. The regeneration mode sequentially includes a first backwash mode, a draw mode, and a second backwash mode. In the first backwash mode, the control system is configured to backwash a water filtration media with an external water source. In the draw mode, the control system is configured to draw ozone into a water tank from an ozone gas source for disposing the ozone into contact with and dispersed through the water filtration media. In the second backwash mode, the control system is configured to expel all of the ozone from the water tank and the water filtration media. The incorporation of the second backwash mode into the regeneration mode of the water treatment system obviates the need to establish compliance with the governmental and regulatory requirements because the water treatment system does not rely on the presence of ozone within the water tank during the treatment or filtration of water. Thus, incorporation of the second backwash mode into the regeneration mode provides for a commercially viable water treatment system which utilizes ozone. Additionally, a regeneration mode which includes a sequential first backwash mode, draw mode, and second backwash mode provides for improved regeneration of a water filtration media that ultimately leads to improved particulate removal, in particular lead removal, from an external water source during the service mode. Accordingly, the subject water treatment system improves the quality, safety, and commercial availability of filtered water for an associated residence, office or industrial building.

The subject invention also includes a method of regenerating a water filtration media of a water treatment system which begins by backwashing the water filtration media with an external water source. The method proceeds by drawing ozone gas into contact with the water filtration media, after which the ozone gas is expelled from the water filtration media before proceeding to filter the external water source through the water filtration media. The subject method provides for improved regeneration of a water filtration media that ultimately leads to improved particulate removal, in particular lead removal, from an external water source during the service mode of the water treatment system.

Accordingly, the subject method also improves the quality and safety of filtered water for an associated residence, office or industrial building.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
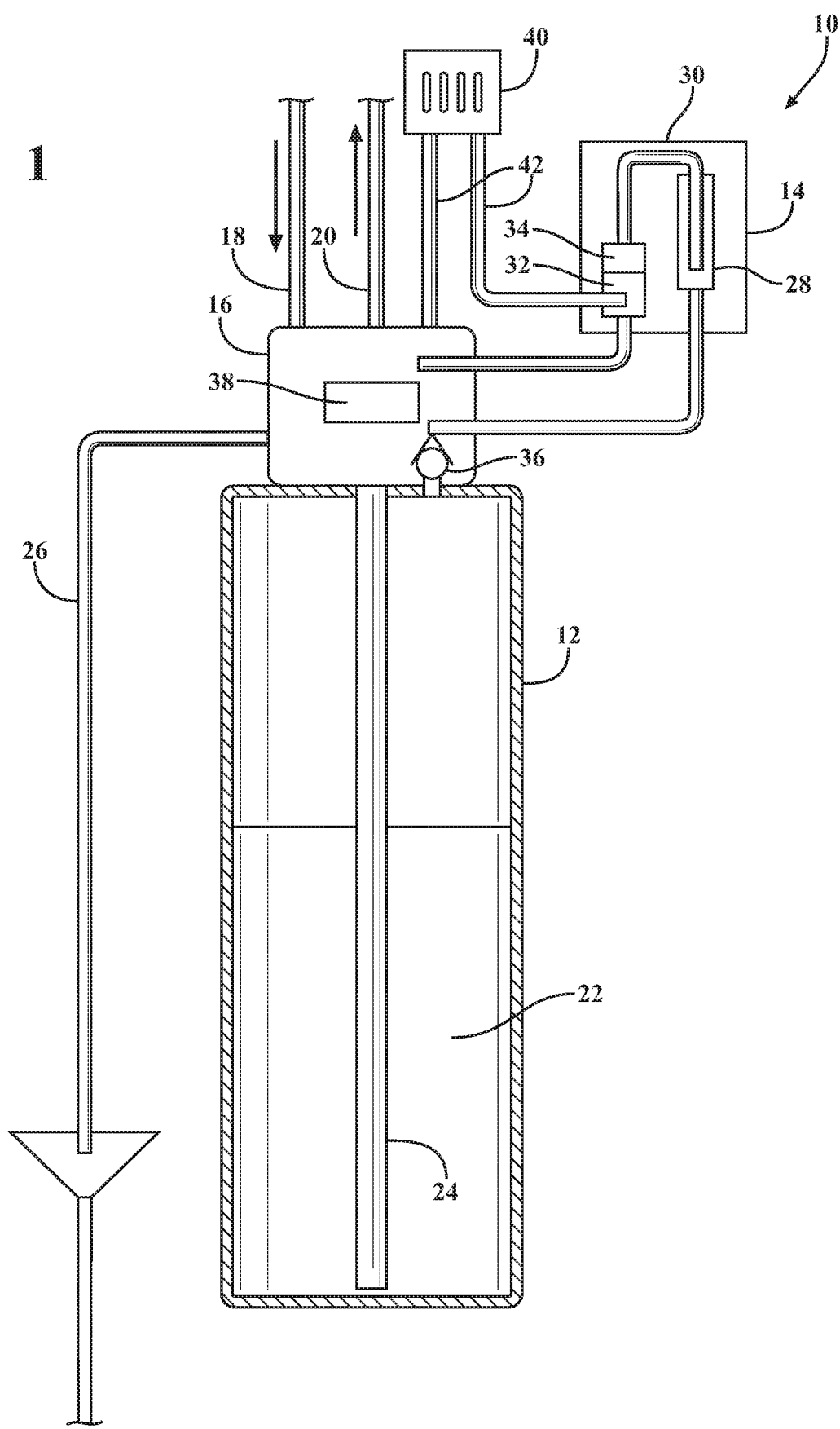
FIG. 1 is a perspective view of a water treatment system in accordance with an aspect of the disclosure.

Referring to the Figures, wherein like numerals indicate corresponding parts throughout the several views, FIG. 1 is a perspective view of a water treatment system, shown generally at 10, including a water tank 12, an ozone gas source 14, and a control system 16. The water treatment system 10 includes a water inlet 18 that is to be disposed in fluid communication with an external water source, such as a well or municipal water distribution system, and a water outlet 20 that is to be disposed in fluid communication with a water supply line for a site, such as a residence, office, or industrial building. The water tank 12 includes a water filtration media 22 that is disposed between the water inlet and outlet 18, 20 for filtering contaminants and particulates from the external water source prior to entrance of water into the site. The water tank 12 further includes a riser tube 24 through which water treated by the water filtration media 22 is further conveyed to the water outlet 20 for delivery to the water outlet 20. The water tank 12 also includes a drain line 26 for discarding contaminants collected in the water filtration media 22 into a sewer or otherwise out of the water treatment system 10 for further processing and disposal.

In a preferred embodiment, the water filtration media 22 may be a heavy metal and VOC filtration/adsorption media, activated carbon, KATALOX®, GREENSAND®, BIRM®, catalytic carbon or any other similar material or combination of said filter materials designed for removing iron, arsenic, lead and VOC's from an external water source. As described immediately above, the water filtration media 22 serves to capture the contaminants and particulates and prevent same from exiting the water treatment system 10 and traveling with the filtered water that passes onto the residence, office, or industrial building. As the amount of water which passes through the water filtration media 22 increases, i.e., as more filtered water is produced by the water treatment system 10, the continued filtration leads to a high concentration of contaminants and particulates in the water filtration media 22, such that further incoming water from the external water source will not undergo effective filtration. As such, the water filtration media 22 must be subjected to a regeneration mode or cycle as will be described in more detail below.

As best shown in FIG. 1, the ozone gas source 14 includes an ozone generator 28 disposed in fluid and electrical communication with the control system 16 for generating ozone gas to be introduced into the water tank 12. In a preferred embodiment, the ozone generator 28 is a corona discharge ozone generator. However other ozone generators 28 could be utilized without departing from the scope of the subject disclosure. According to an aspect, the corona discharge ozone generator preferably operates at 12 VDC from a 115 V input to produce between 0.200 and 0.220 200-240 Milligrams/hour of ozone gas for introduction into the water tank 12. However, the rate of ozone output by the corona discharge ozone generator can be adjusted by service personnel or an end user based on various factors including the volume of the water tank, quality of source water, amount of ozone desired in the water tank, local regulations, as well as a number of other factors. As best shown in FIG. 1, the ozone gas generator 28 is disposed within a housing 30 along with an ozone control board 32 and an ozone solid state relay switch 34, each of which are disposed in electrical communication with the ozone gas generator 28. As will be described in more detail below, the ozone solid state relay switch 34 is also electrically connected, and thus operable by, the control system 16 of the water treatment system 10.

As best illustrated in FIG. 1, the control system 16 includes a control valve 36 which is fluid communication with the ozone gas source 14 for drawing ozone from the ozone gas generator 28 and into the water tank 12 and then sequentially controlling the containment and release of the ozone from the water tank 12 once introduced therein. In a preferred embodiment, the control valve 36 is capable of operating at pressures of between 20 and 150 psi (pounds per square inch). The control valve 36 is also preferably comprised of a venturi nozzle and a check valve. However, other valves could be utilized without departing from the subject disclosure. As best illustrated in FIG. 1, the control system 16 also includes a controller 38 that is configured to operate a service mode and a regeneration mode of the water treatment system 10.

The water treatment system 10 is set-up to filter water when the controller 38 is operating in the service mode. In other words, when the water treatment system 10 operates in the service mode, the external source water is permitted to enter the water tank 12 via the water inlet 18 and pass through the control system 16 for subsequent filtration of particulates and contaminates by the water filtration media 22 in accordance with the aforementioned disclosure. As previously mentioned, with the passing of time, the water filtration media 22 can develop a significant accumulation of particulates and contaminates that reduce the effectiveness of further filtration of water. Accordingly, it is necessary for the control system 16 to switch from a service mode to a regeneration mode on a predetermined basis so that the water filtration media 22 can be regenerated to restore its filtration capabilities. For example, according to one aspect, the controller 38 is programmed to switch from the service mode to the regeneration mode after a specific volume of water has passed through the control system 16 and into the water tank 12. In this instance, the controller 38 meters the water drawn either into the water tank 12 from the external water source or out of water treatment system 10 in order to gauge whether it is appropriate to enter the regeneration mode to begin regeneration of the water filtration media 22. According to another aspect, the controller 38 can be programmed to switch from the service mode to the regeneration mode on a predetermined period of time, such as on a selected day (e.g., 1-28) of the month or after the passage of a particular amount of time, e.g. days, weeks, months, or any combination thereof. Once the controller 38 switches to the regeneration mode, the exit of water out of the water treatment system 10 is ceased until the water filtration media 22 is regenerated in accordance with the following disclosure.

In a preferred arrangement, the regeneration mode of the controller 38 is configured to include a first backwash mode, a draw mode, a second backwash mode, and then optionally a rinse mode. During the first backwash mode, the controller 38 is configured to redirect the water received from the external water source for use in backwashing the water filtration media 22. In this first backwash mode, the external water is forced into the water tank 12 for lifting the water filtration media 22 and cleaning and discarding contaminants collected in the water filtration media 22 out the drain line 26 and into a sewer in accordance with well-known backwashing principles. Put another way, the regeneration mode causes water to unsettle and push up the water filtration media 22 to dislodge captured contaminants/particulates and carry the captured contaminants/particulates from the water tank 12 and out of the water filtration media 22 and down a drain line 26. In a preferred arrangement, the controller 38 is programmed to maintain the water treatment system 10 in the first backwash mode for a predetermined number of minutes, after which the controller 38 switches the water treatment system 10 into the draw cycle.

Once the backwashing stage is complete, the regeneration mode continues by having the controller 38 signal or switch the water treatment system 10 into the draw mode, which activates relay switch 34 of ozone gas source 14 to in turn cause ozone gas generator 28 to begin generating ozone gas. The controller 38 also activates the control valve 36 to begin drawing the generated ozone gas into the water tank 12. As previously mentioned, in a preferred arrangement, the check valve includes a venturi nozzle and check valve. Thus, when the controller 38 enters a draw cycle, suction is induced at the venturi nozzle in a known manner which causes a vacuum to be imparted within a conduit extending between the water tank 12 and the ozone gas source 14, which in turn opens the check valve and allows the ozone gas to be drawn from the ozone gas source 14 and into the water tank 12. The drawing of the ozone into the water tank 12 and through the water filtration media 22 advantageously allows the ozone to form a fresh layer of ozone above the water filtration media 22, which contacts and then disperses through the water filtration media 22 to disinfect and re-activate the water filtration media 22 and any water remaining therein. In other words, the drawing of ozone into the water tank 12 after the first backwash mode allows the water filtration media 22 to be restored or regenerated to levels not previously achievable in the prior art systems with only a traditional backwash mode or cycle. As will be explained in more detail below, the use of the draw cycle provides for a reduction in particulates and contaminants during filtration that was not previously achievable in a commercial water filtration system which incorporated the use of ozone.

As previously mentioned, prior art systems which utilize ozone to chemically modify water are subject to strict governmental and regulatory requirements and thus not practical for commercial water filtration systems. Thus, according to an aspect, the subject water treatment system 10 incorporates a second backwash mode into the regeneration mode to remove or expel all of the ozone from the water tank 12 and the water filtration media 22 before the external water source is re-introduced into the water tank 12 for filtration and subsequent distribution to the site. In other words, the controller 38 is configured to include a second backwash mode which completely removes any residual ozone as well as any water that is present in the water tank 12 and the water filtration media 22 during operation of the preceding draw mode. Preferably, any unused and residual ozone gas drawn out of the tank by the control valve 36 is sent to the drain line 26 for disposal in the sewer or otherwise. However, other means of expelling ozone from the water tank 12 and the water filtration media 22 can be utilized without departing from the scope of the subject disclosure. In either scenario, the second backwash mode removes all of the ozone in the water tank 12 and thus a layer of ozone is no longer present in the water tank 12 upon completion of second backwash cycle. In a preferred arrangement, the controller 38 is pre-programmed to maintain the second backwash mode for a predetermined period of time, such as 1-99 minutes. However, other modes of maintaining the second backwash mode, such as measuring an ozone content of the ozone/water combination passing through the control valve 36 or the drain line 26 until the ozone is at a pre-determined low level, can be utilized without departing from the subject disclosure.

Upon completion of the second backwash cycle of the regeneration mode, the controller 38 preferably switches the water treatment system 10 into a rinse mode. However, in an aspect, the rinse mode is optional and not required. In this instance, since the water filtration media 22 has been sufficiently regenerated, the controller 38 can proceed to effectuate implementation of the service mode upon which water filtration of the external water source once again commences by the water treatment system 10. In the event the controller 38 is programmed to operate in the rinse mode, the controller 38 proceeds to pass external source water into the water tank 12, through the water filtration media 22, and out the drain line 26 to make sure that all of the ozone, particulates, and contaminants which remain from the first and second backwash modes as well as the draw modes have been removed. Additionally, the rinse cycle ensures the elimination of any turbidity from subsequent treated water which is passed onto the residential home or industrial building during the service mode. After an appropriate amount of time has passed and the rinse mode is complete, the controller 38 switches the water treatment system 10 back into the service mode after which treatment of the external water source once again commences by the water treatment system 10.

With reference to the following test results, a controller 38 which is programmed with a regeneration mode including the first backwash mode, the draw mode, as well as the second backwash mode leads to a commercial water treatment system which provides significantly improved lead removal for external water source, particularly those which include very high lead levels. For example, the following test results were all gathered on residential homes equipped with the subject water treatment system and situated in the Flint, Mich. area during the Flint water crisis:

| Sample ID | Untreated Lead PPB | Treated Lead PPB |
| --- | --- | --- |
| A | 40 PPB | 1 PPB |
| B | 20 PPB | 1 PPB |
| C | 590 PPB | 370 PPB |
| D | 21 PPB | 1 PPB |

As the above test results illustrate, a commercial water treatment system which incorporates a regeneration mode including a first backwash mode, a draw mode, and a second backwash mode provides improved particulate removal, in particular lead removal, from an external water source to improve the quality and safety of filtered water for an associated residence, office or industrial building. Furthermore, the advantages of the water treatment system 10 are further enhanced by its low initial installation cost and ability to be maintained inexpensively.

In a preferred embodiment, the control system 16 preferably includes electronic circuitry to transform a 115 VAC, 60 Hz supply into 12 VDC at 850 Ma (mille Amperes) or 10.2 watts for operation of the control system 16. The control system 16 is also preferably rated to handle a temperature range of 40 to 115 degrees Fahrenheit. As best shown in FIG. 1, the control system 16 preferably also includes a controller relay terminal for switching between the operating modes.

As further illustrated in FIG. 1, the control system 16 receives external source water and, depending on the mode of the water treatment system 10, will direct the external source water into the water tank 12 to be treated, will direct the external source water into the water tank 12 for lifting and backwashing the water filtration media 22, or will permit ozone gas to be drawn into water tank 12 via the control valve 36. As also shown in FIG. 1, the ozone gas source 14 and control system 16 are each preferably in electrical connection with an electrical reception outlet 40 via electrical cords 42.

Figure 2:
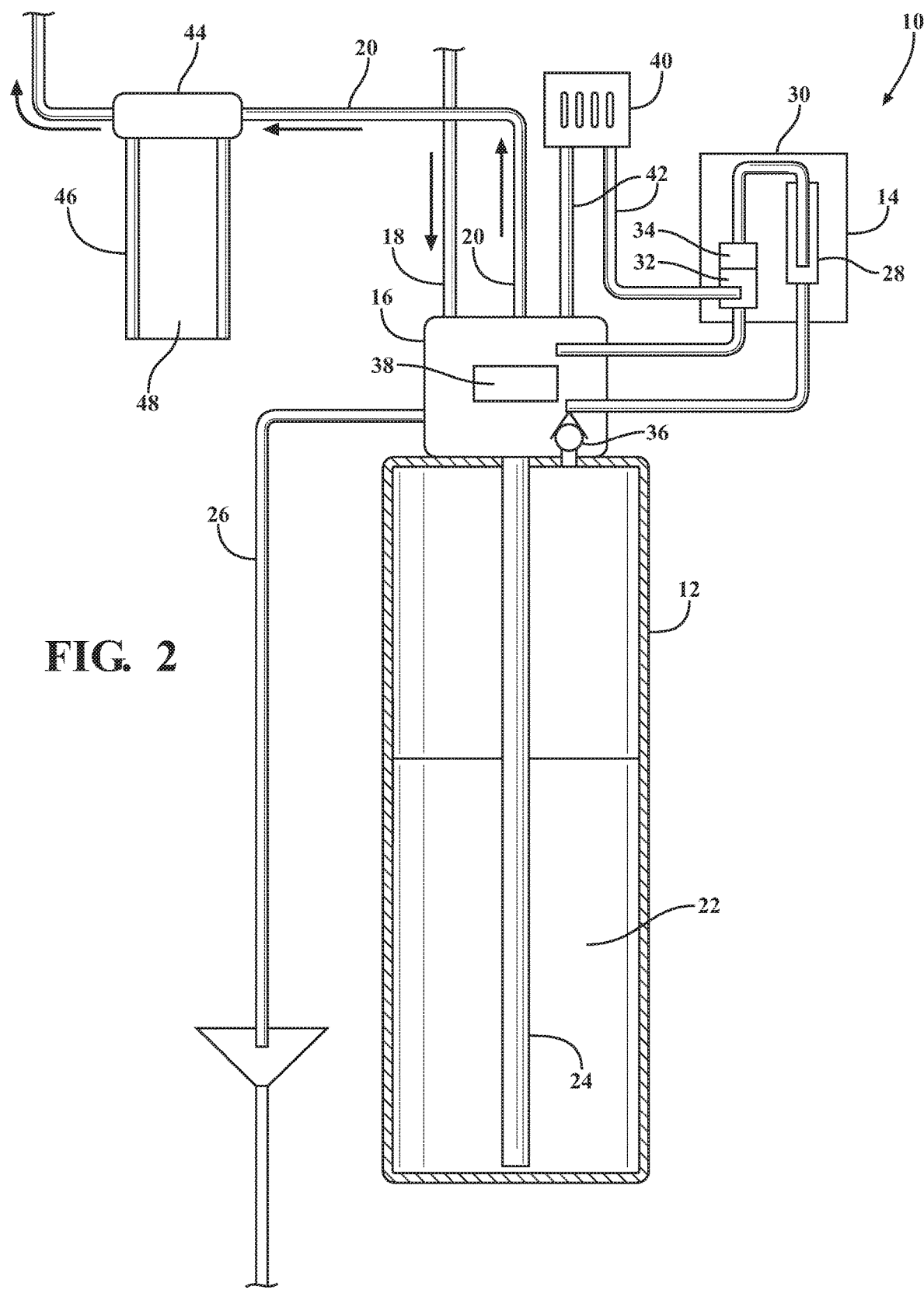
FIG. 2 is a perspective view of the water treatment system which further includes a post-treatment filter in accordance with another aspect of the disclosure.

As best illustrated in FIG. 2, according to another aspect, the water treatment system 10 can also include a post-treatment filter 44 disposed in fluid communication with the water outlet 20 for adding further treatment of the filtered water prior to entering the site. For example, in one instance the post treatment filter 44 can include a ten-inch post-treatment filter housing 46 which houses an antimicrobial filter cartridge 48. The addition of this particular post-treatment filter 44 to the water outlet 20 gives the water treatment system 10 additional disinfection capabilities for the reduction of *E. coli*, staff and legionella bacterial. In another aspect, the post-treatment filter 44 can include a twenty inch post-filter housing 46 which houses an ultra-filter cartridge 48. With this aspect, the water treatment system 10 is able to remove sub-particle lead from lead contaminated water supplies. The addition of this post-treatment filter 44 additionally makes the water treatment system compliant with the NSF guideline for lead removal 4 GPM filters.

Figure 3:
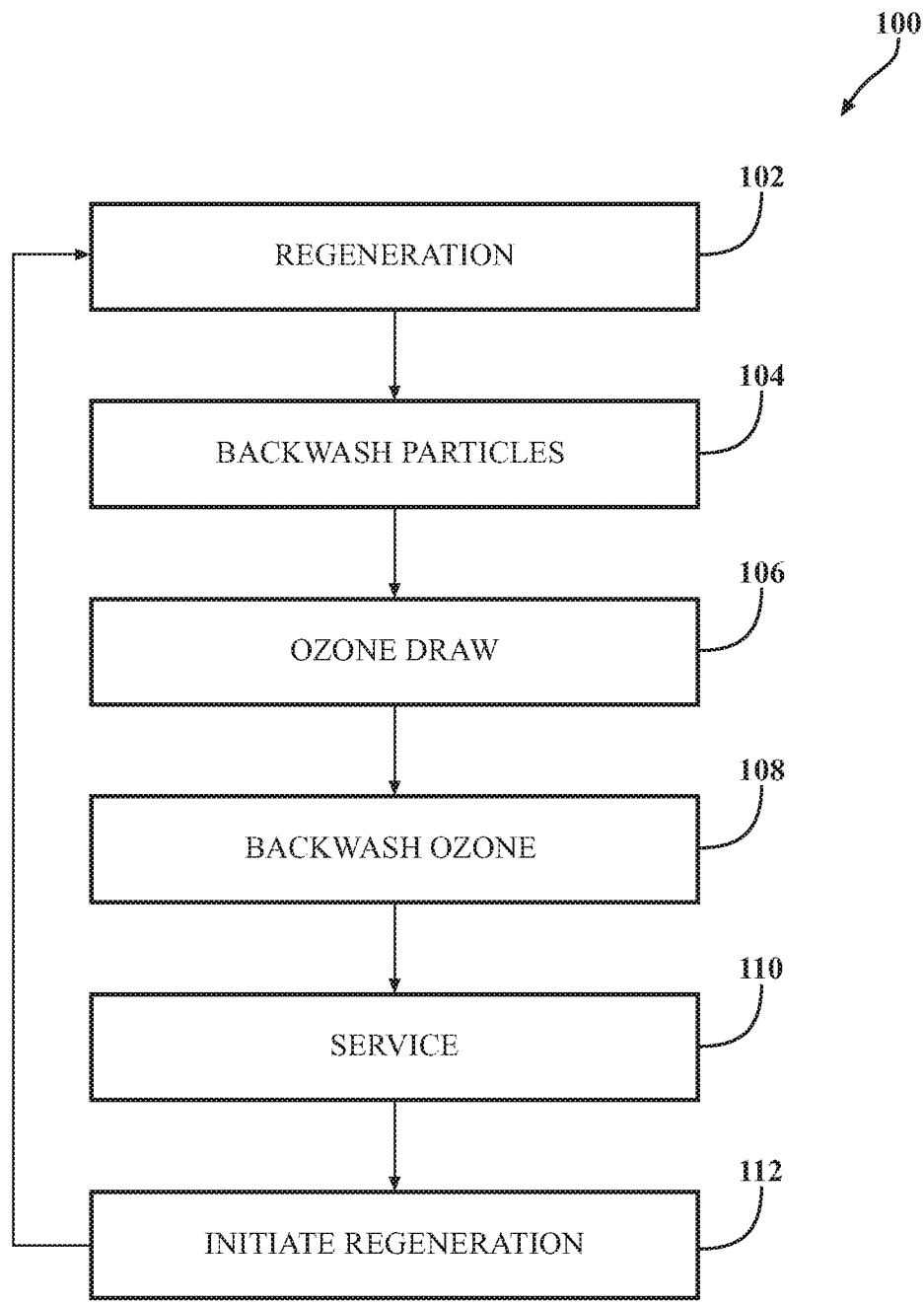
FIG. 3 is a method of regenerating a water filtration media of a water treatment system in accordance with another aspect of the disclosure.

With reference to FIG. 3, the subject invention also includes a method, shown generally at 100, of regenerating a water filtration media 22 of a water treatment system 10, the method. As described above, as the amount of water which passes through the water filtration media 22 during a service mode increases, i.e., as more filtered water is produced by the water treatment system 10, the continued filtration leads to a high concentration of contaminants and particulates in the water filtration media 22, such that further incoming water will not undergo effective filtration. As such, the water filtration media 22 must be subjected to a regeneration mode or cycle to improve its filtering capabilities.

The method of regenerating the water filtration media 22 begins by 102 subjecting the water filtration media 22 to a first backwash with an external water source, such as that received at the water inlet 18 of the water tank 12. As described above, the first backwash step 102 includes forcing the external water source into the water tank 12 for lifting the water filtration media 22 and cleaning and discarding contaminants collected in the water filtration media 22 to a drain line 26. In a preferred arrangement of the method, the first backwash step 102 is performed for a predetermined period of time, (e.g., minutes).

Upon completion of the first backwash step 102, the method proceeds by 104 subjecting the water filtration media 22 to ozone gas to disinfect and re-activate the water filtration media 22 and any external water source remaining therein. More particularly, step 104 includes drawing ozone from an ozone gas source 14 into contact with and dispersed through the water filtration media 22 to further restore or regenerate the water filtration media 22. As described previously, the use of the ozone draw mode 104 provides for a reducing in particulates and contaminants in the water filtration media 22 that was not previously achievable in a commercial water filtration system which incorporated the use of ozone.

Upon completion of the ozone draw step 104, the method proceeds by 106 subjecting the water filtration media 22 to a second backwash with the external water source to remove and expel all of the ozone from the water filtration media 22. As previously mentioned, prior art methods which utilized ozone to chemically modify water are subject to strict governmental and regulatory requirements and thus not practical for commercial water filtration systems and methods. Thus, the second backwash step 106 advantageously removes any residual ozone that is present in the water filtration media 22 from the preceding ozone draw step 104, thus obviating the need to establish compliance with the governmental and regulatory requirements. Preferably, during the second backwash step 106, any unused and residual ozone gas is drawn out of the water tank 12 by a control valve 36 and sent to the drain line 26 for disposal in the sewer or otherwise. In a preferred arrangement, the second backwash step 106 is maintained for a predetermined period of time, such as 1-99 minutes. However, the second backwash step 106 can also include monitoring an ozone content passing through the drain line and thus ceasing the second backwash step 106 when the monitored ozone content reaches a predetermined low level.

Upon completion of the second backwash step 106, the water filtration media 22 has been sufficiently regenerated and the method can proceed by 108 subjecting the water filtration media 22 to the service mode during which the external water source is passed through the water filtration media 22 for filtration in accordance with the aforementioned description. However, according to an aspect, the subject method can also additionally include the step of rinsing the water filtration media with the external water source and sending the rinsed water to the drain line subsequent to the step of expelling the ozone from the water filtration media and prior to passing the external water source through the water filtration media. As mentioned previously, this additional step ensures sure that all of the ozone, particulates, and contaminants which remain from the first and second backwash modes as well as the draw modes have been removed. Additionally, the rinse cycle ensures the elimination of any turbidity from subsequent treated water which is passed onto the residential home or industrial building upon a return of the water treatment system 10 to the service mode.

In either arrangement, and as previously mentioned, with the passing of time the water filtration media 22 can develop a significant accumulation of particulates and contaminants that reduce the effectiveness of further filtration. Accordingly, after the step of 108 subjecting the water filtration media 22 to the service mode, the method proceeds by 110 determining when to switch the water filtration media 22 out of the service mode and back into the regeneration mode. According to an aspect, step 110 includes monitoring a volume of water filtered by the water filtration media 22 and switching from the service mode to the regeneration mode when the monitored volume meets a predetermined volume of filtered water. According to another aspect, step 110 includes switching from the service mode to the regeneration mode on a selected day (e.g., 1-28) of the month. According to yet another aspect, step 110 includes switching from the service mode after the passage of a particular amount of time, e.g., days, weeks, months, or any combination thereof. Once the method switches the water filtration media from the service mode to the regeneration mode, the passage of water through the water filtration media 22 is ceased until the water filtration media 22 is regenerated in accordance with the aforementioned disclosure.

The foregoing invention has been described in accordance with the relevant legal standards, thus the description is exemplary rather than limiting in nature. Variations and modifications to the disclosed embodiment may become apparent to those skilled in the art and fall within the scope of the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A water treatment system comprising:
   a water tank including a water inlet to be disposed in fluid communication with an external water source and a water outlet to be disposed in fluid communication with a site;
   a water filtration media disposed within said water tank for filtering contaminants from the external water source;
   an ozone gas source disposed in fluid communication with said water tank;
   a control system including a controller disposed in communication with a control valve, said control system configured to operate a service mode for the water treatment system for filtering the external water source by said water filtration media;
   said control system configured to operate a regeneration mode for the water treatment system for ceasing said filtering of the external water source and regenerating said water filtration media;
   said regeneration mode sequentially including a first backwash mode, a draw mode, and a second backwash mode;
   wherein said first backwash mode backwashes said water filtration media with only the external water source to remove contaminants captured by said water filtration media during said service mode;
   wherein said draw mode draws only ozone into said water tank from said ozone gas source and into contact with said water filtration media; and
   wherein said second backwash mode expels all of the ozone from said water tank and said water filtration media.

2. The water treatment system as set forth in claim 1, wherein said control system is configured to switch the water treatment system into said service mode upon completion of said regeneration mode to treat water with said regenerated water filtration media.

3. The water treatment system as set forth in claim 1, wherein said water tank includes a drain line and said regeneration mode further includes a rinse mode subsequent to said second backwash mode to pass the external water source into said water tank, through said water filtration media, and out said drain line for ensuring that all of the ozone has been removed from said water tank and said water filtration media.

4. The water treatment system as set forth in claim 1, wherein said controller of said control system includes a water meter configured to monitor a volume of the external water source filtered by said water filtration media and said control system is configured to switch the water treatment system from said service mode to said regeneration mode when said monitored volume is equal to a predetermined volume of water.

5. The water treatment system as set forth in claim 1, wherein said controller of said control system includes a programmed timer configured to monitor a period of time the water treatment system operates in said service mode and said control system is configured to switch the water treatment system from said service mode to said regeneration mode when said monitored period of time is equal a predetermined period of time.

6. The water treatment system as set forth in claim 5, wherein said predetermined period of time is a selected day of the month.

7. The water treatment system as set forth in claim 1, wherein said controller of said control system includes a programmed timer, and said control system is configured to maintain the water treatment system in said first backwash mode for a predetermined number of minutes.

8. The water treatment system as set forth in claim 1, wherein said control valve of said control system includes an ozone control valve disposed in fluid communication with said ozone gas source and said water tank for drawing ozone from said ozone gas source and into said water tank during said draw mode.

9. The water treatment system as set forth in claim 8, wherein said ozone control valve is disposed in fluid communication with a drain line for drawing ozone out of said water tank and said water filtration media and towards said drain line during said second backwash mode.

10. The water treatment system as set forth in claim 1, wherein said controller of said control system includes a programmed timer and said control system is configured to maintain said draw mode for a predetermined number of minutes.

11. The water treatment system as set forth in claim 1, further including a post-treatment filter disposed in fluid communication with said water outlet.

12. The water treatment system as set forth in claim 11, wherein said post-treatment filter includes a ten-inch post-treatment filter housing which houses an antimicrobial filter cartridge.

13. The water treatment system as set forth in claim 11, wherein said post-treatment filter includes a twenty-inch post-filter housing which houses an ultra-filter cartridge.

* * * * *